March 3, 1936.   W. C. HEDGCOCK   2,032,479
TRUCK
Filed May 9, 1932   4 Sheets-Sheet 1

Inventor:
William C. Hedgcock,
By Atkinson, Huxley, Byron & Knight
Attys

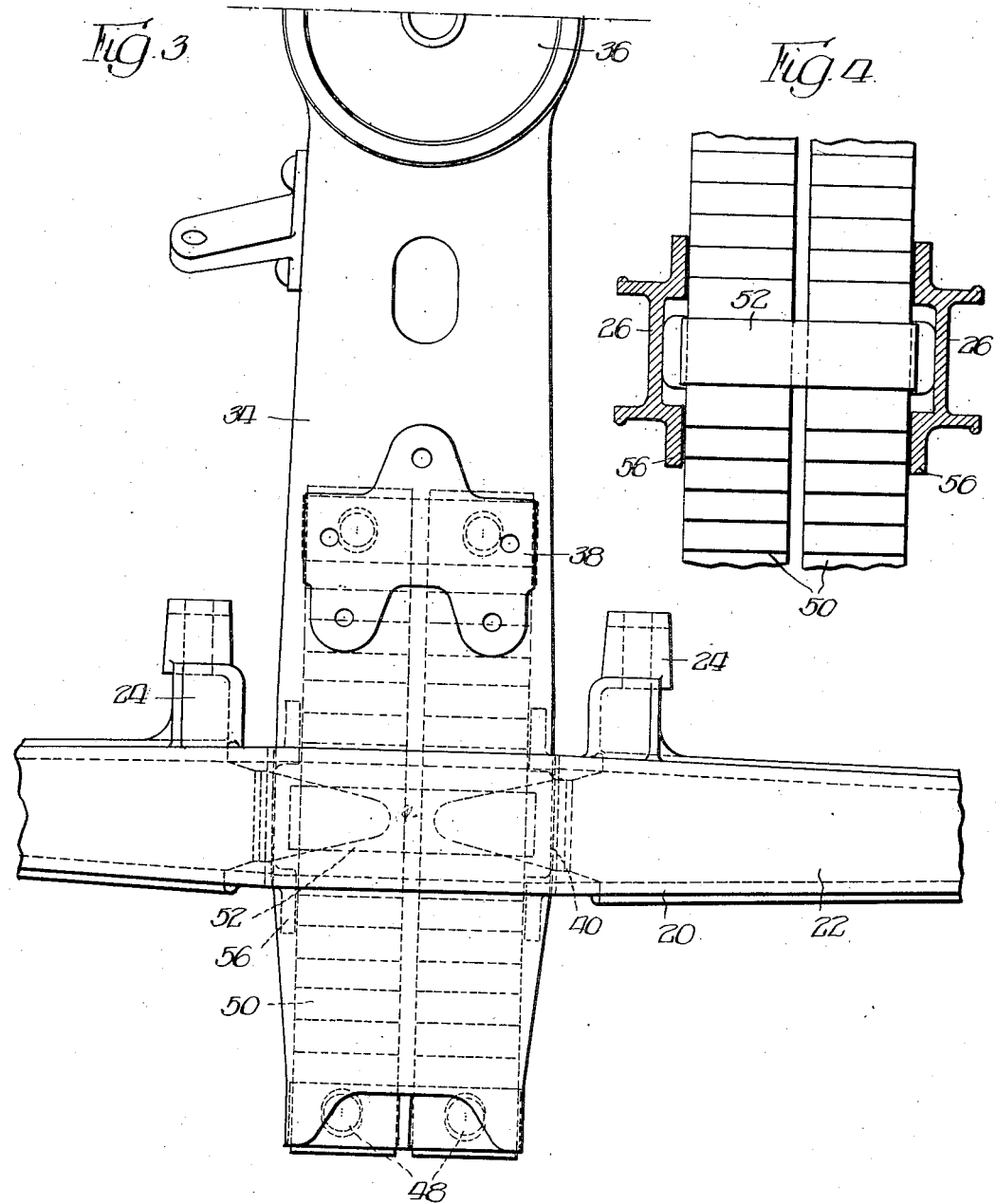

March 3, 1936.  W. C. HEDGCOCK  2,032,479
TRUCK
Filed May 9, 1932  4 Sheets-Sheet 3

Inventor:
William C. Hedgcock,
By Wilkinson, Huxley, Byron & Knight
Attys.

March 3, 1936.  W. C. HEDGCOCK  2,032,479
TRUCK
Filed May 9, 1932   4 Sheets-Sheet 4
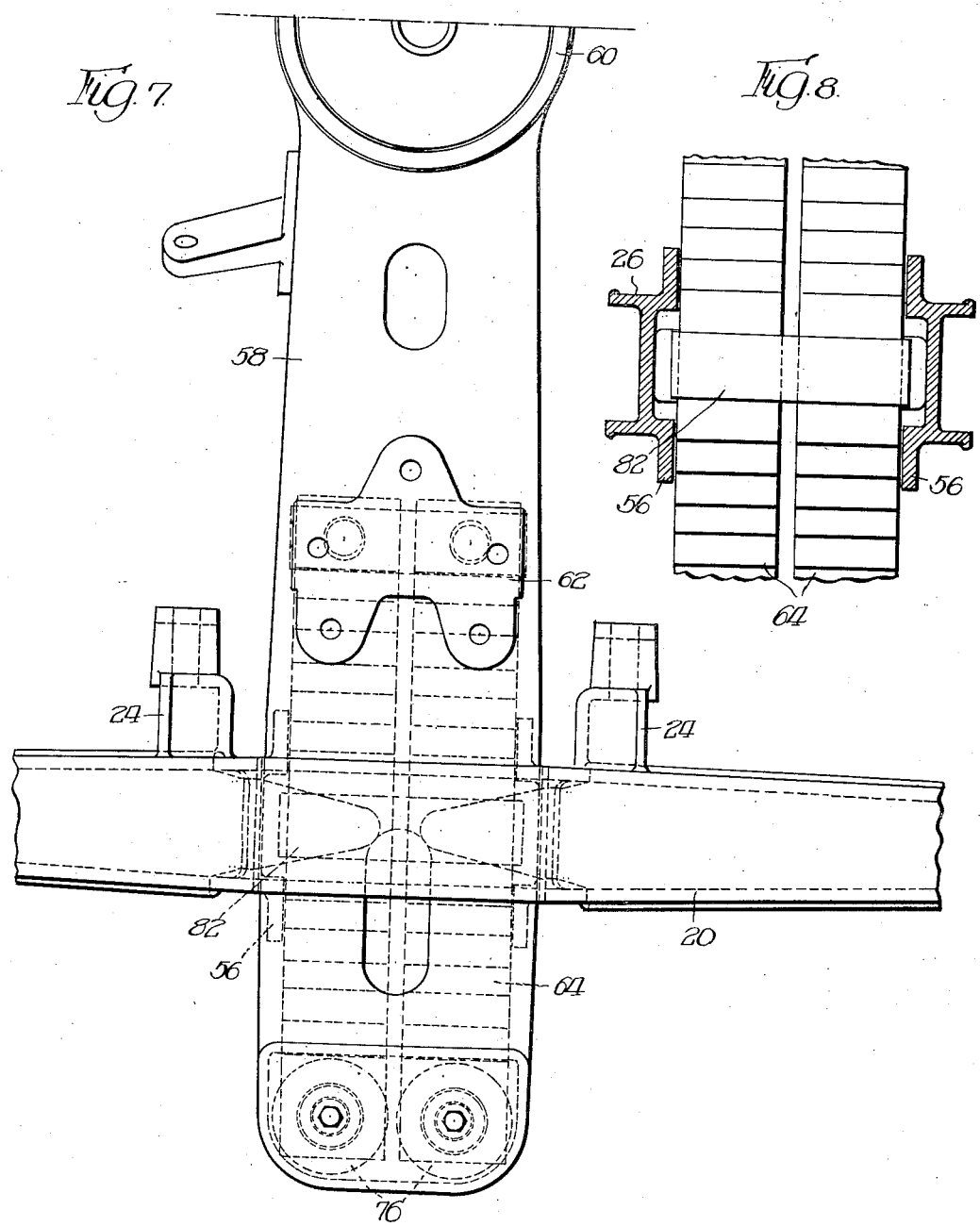

Patented Mar. 3, 1936

2,032,479

UNITED STATES PATENT OFFICE 2,032,479

TRUCK

William C. Hedgcock, Wilmette, Ill., assignor to American Steel Foundries, Chicago, Ill., a corporation of New Jersey Application May 9, 1932, Serial No. 610,020

39 Claims. (Cl. 105—197)

This invention pertains to car trucks.

An object of this invention is to provide a car truck wherein a load carrying member is provided for maintaining the truck in squared relation.

Another object is to provide a truck construction wherein a load carrying member in the nature of a bolster is provided, the bolster and side frames having means for maintaining the truck in squared relation.

Still another object is to provide a truck construction wherein a bolster or other load carrying member is resiliently supported on a side frame, the side frame having means for maintaining the truck in squared relation through cooperation between a portion of the side frame and resilient means and the load carrying member.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 3 is a fragmentary top plan view of the truck construction illustrated in Figures 1 and 2;

Figure 4 is a fragmentary sectional top plan view of the springs and associated bearing surfaces of the column guides;

Figure 7 is a fragmentary top plan view of the truck construction illustrated in Figures 5 and 6;

Figure 8 is a fragmentary sectional top plan view of the springs and associated bearing surfaces of the column guides.

Figure 1:
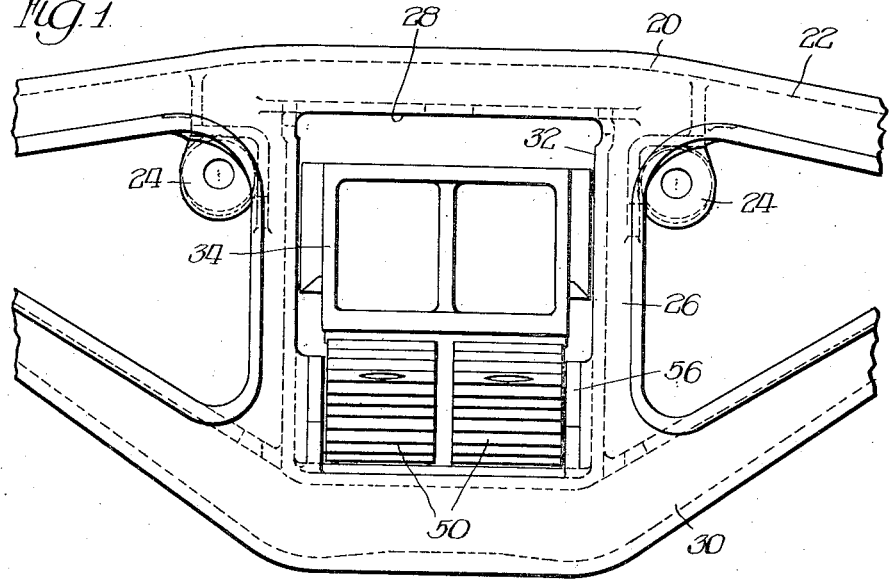
Figure 1 is a fragmentary side elevation of a truck construction embodying the invention.

This application is a continuation in part of applications Serial Nos. 559,617, and 559,619, filed August 27, 1931, respectively.

In the truck constructions embodying the invention, the side frame 20 is provided with the compression member 22 having brake hanger brackets 24 integral therewith, and with the spaced column guides 26 forming a window 28 with the compression member 22 and the tension member 30. The compression and tension members merge adjacent their ends and are provided with the journal boxes (not shown) adapted to have cooperation at the journal ends with wheel and axle assemblies. The column guides 26 are provided adjacent the upper portions thereof with the bolster guide portions 32 adapted to have cooperative relation with the suitable column guide cooperating portions on the bolster.

Figure 2:
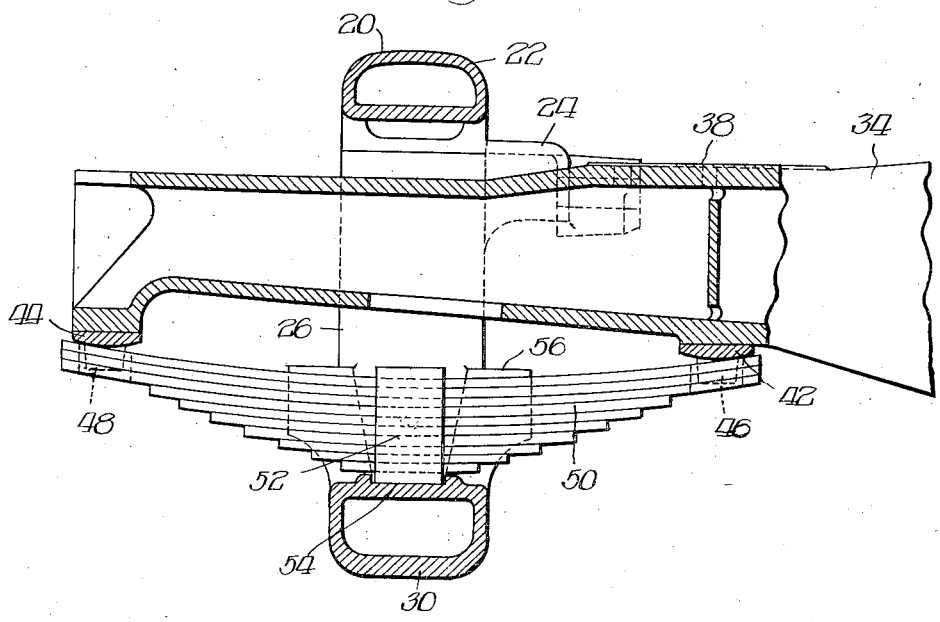
Figure 2 is a transverse fragmentary sectional elevation of the truck construction illustrated in Figure 1, the section being taken substantially in the plane of the transverse center line of the truck.

In the truck construction illustrated in Figures 1 to 4 inclusive, the bolster 34 is provided with the center bearing 36 and the side bearing 38 and extends through the window 28, being provided with the column guide cooperating portions 40 having slidable cooperation with the portions 32 of the column guides 26. The bolster is provided with the inner and outer spring seats 42 and 44, preferably arcuate in shape and being provided with the depending positioning dowels 46 and 48 receivable in suitable apertures formed in the inner and outer legs of the semi-elliptic leaf spring assemblies 50. The semi-elliptic springs are provided with the spring band 52 adapted to be received in the seat 54 formed in the tension member between the column guides, the seat engaging portion of said band being flat or arcuate.

In this truck construction no spring plank is provided, though of course it is to be understood that one may be employed to maintain the truck frames in squared relation, and to prevent twisting action which naturally occurs between the bolster and side frame, as, for instance, when the truck is rounding a curve. The column guides 26 adjacent the lower portions of the window are provided with spaced widened portions 56 forming guiding faces abutting against the sides of the elliptic springs and having the minimum amount of clearance. The guiding faces 56 extend inwardly and are separated by a substantially V-shaped groove so that the faces embrace the spring band 52 serving as positioning means and extending to the seat 54.

Figure 5:
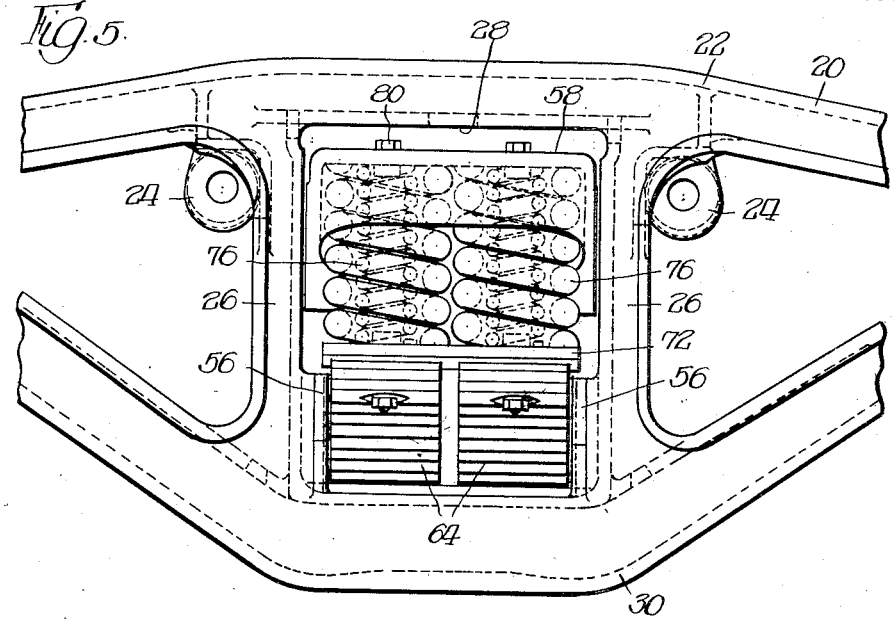
Figure 5 is a fragmentary side elevation of a modified form of truck construction embodying the invention.
Figure 6:
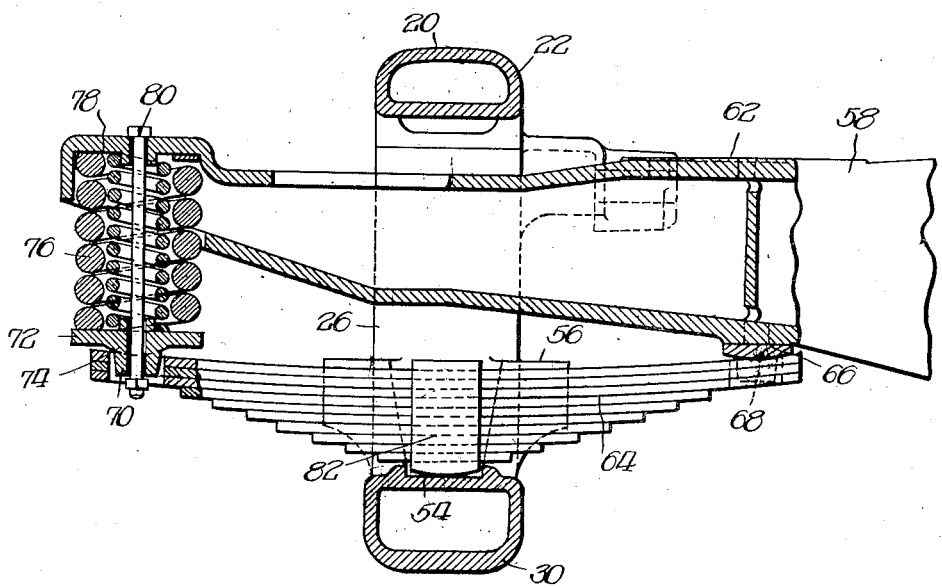
Figure 6 is a transverse fragmentary sectional elevation of the truck construction illustrated in Figure 5, the section being taken substantially in the plane of the transverse center line of the truck.

In the truck construction illustrated in Figures 5 to 8, inclusive, the bolster 58 is provided with the center and side bearings 60 and 62, and extends through the window 28 of the side frame. In this case the bolster 58 is adapted to be supported at its inner end on the inner leg of the semi-elliptic leaf spring assembly 64, the arcuate seat 66 cooperating with said leg and being provided with the depending positioning dowel 68 receivable in the suitable aperture in the inner leg of the leaf spring. The outer leg of the leaf spring is apertured for the reception of the positioning dowel 70 of the coil spring seat 72, the seat preferably being provided with the arcuate left spring engaging seat 74.

The nest of coil springs 76 is seated on the spring seat 72 and supports the outer end of the bolster at the coil spring seat 78, the rod 80 being provided for facilitating assembly. The columns 26 are constructed in accordance with those of the side frame described with respect to Figures 1 to 4 inclusive, being provided with the spaced guiding faces 56 embracing the spring band 82 seated on the seat 54 in the window 28. The guiding faces abutting against the sides of the leaf springs prevent the twisting action which is apt to occur in a truck construction, especially where no spring plank is used. Where a spring plank is used, the faces serve as ancillary means for preventing the twisting action.

In trucks using these guiding faces the clearance between the faces and spring is preferably less than the clearances between the columns and the column cooperating portions of the bolster, though if the clearances are equal or substantially equal, the faces still operate as they are of greater extent than the columns in a transverse direction.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a truck, the combination of a side frame including tension and compression members and spaced column guides integrally connecting said members and forming a window, a bolster extending into said window, transversely disposed, resilient means interlocked with and supporting said bolster on said side frame, and means on said side frame cooperating with said resilient means for maintaining said side frame and bolster in squared relation.

2. In a truck, the combination of a side frame including tension and compression members and spaced column guides integrally connecting said members and forming a window, a bolster extending into said window, a transversely disposed leaf spring interlocked with and supporting said bolster on said side frame, and means on said side frame cooperating with said leaf spring for maintaining said side frame and bolster in squared relation.

3. In a truck, the combination of a side frame including tension and compression members and spaced column guides integrally connecting said members and forming a window, a bolster extending into said window, a leaf spring interlocked with and supporting said bolster on said side frame, said spring having a spring band, and means on said side frame cooperating with said leaf spring and embracing said spring band for maintaining said side frame and bolster in squared relation.

4. In a truck, the combination of a side frame including tension and compression members and spaced column guides integrally connecting said members and forming a window, a load carrying member extending into said window, resilient means supporting said load carrying member on said side frame and interlocking with said load carrying member, and transversely extending means on said side frame cooperating with said resilient means for maintaining said side frame and bolster in squared relation.

5. In a truck, the combination of a side frame including tension and compression members and spaced column guides integrally connecting said members and forming a window, a load carrying member extending into said window, a leaf spring supporting said load carrying member on said side frame and interlocking with said load carrying member, and transversely disposed means on said side frame cooperating with said leaf spring for maintaining said side frame and bolster in squared relation.

6. In a truck, the combination of a side frame including tension and compression members and spaced column guides integrally connecting said members and forming a window, a load carrying member extending into said window, a leaf spring supporting said load carrying member on said side frame and interlocking with said load carrying member, and means on said side frame cooperating with said leaf sring and embracing said spring band for maintaining said side frame and bolster in squared relation.

7. In a car truck, the combination of a side frame having a tension and compression member and spaced column guides, a bolster having guide members slidably cooperating with said guides, said bolster having an end portion extending outwardly of said side frame, a leaf spring mounted on said side frame between said guides and having an end disposed inwardly of said side frame and in supporting relation to said bolster, said spring having an outer end disposed outwardly of said side frame, a coil spring interposed between said outer end of said spring and said end portion of said bolster, and means on said column guides cooperating with one of said springs for preventing said springs from tipping sideways and angling horizontally with respect to said side frame.

8. In a car truck, the combination of a side frame having a tension and compression member and spaced column guides, a bolster having guide members slidably cooperating with said guides, said bolster having an end portion extending outwardly of said side frame, a leaf spring mounted on said side frame between said guides and having an end disposed inwardly of said side frame and in supporting relation to said bolster, said spring having an outer end disposed outwardly of said side frame, a coil spring interposed between said outer end of said spring and said end portion of said bolster, and means on said column guides cooperating with said leaf spring for preventing said spring from tipping sideways and angling horizontally with respect to said side frame.

9. In a car truck, the combination of a side frame having a tension and compression member and spaced column guides, a bolster having guide members slidably cooperating with said guides, said bolster having an end portion extending outwardly of said side frame, a leaf spring mounted on said side frame between said guides and having an end disposed inwardly of said side frame and in supporting relation to said bolster, said spring having an outer end disposed outwardly of said side frame, and a coil spring interposed between said outer end of said spring and said end portion of said bolster, and means on said side frame cooperating with said spring for preventing said spring from tipping sideways and angling horizontally with respect to said side frame.

10. In a car truck, the combination of a side frame having a tension and compression member and spaced column guides, a bolster having guide members slidably cooperating with said guides, said bolster having an end portion extending outwardly of said side frame, a leaf spring mounted on said side frame and in the plane thereof and between said guides and having an end disposed inwardly of said side frame and in supporting relation to said bolster, said spring having an outer end disposed outwardly of said side frame, and a coil spring interposed between said outer end of said spring and said end portion of said bolster, and spaced guiding faces on said column guides cooperating with said spring for preventing said spring from tipping sideways and angling horizontally with respect to said side frame.

11. In a car truck, the combination of a side frame having a tension and compression member and spaced column guides, a bolster extending between said guides, said bolster having an end portion extending outwardly of said side frame, a leaf spring mounted on said side frame between said guides and having an end disposed inwardly of said side frame and in supporting relation to said bolster, said spring having an outer end disposed outwardly of said side frame and resiliently supporting said end portion of said bolster, and spaced guiding faces on said column guides cooperating with said spring for preventing said spring from tipping sideways and angling horizontally with respect to said side frame.

12. In a car truck, the combination of a side frame, a bolster, a leaf spring supported on said side frame and interlocked with said bolster, a coil spring operatively connected to said leaf spring and to said bolster, and means on said side frame cooperating with one of said springs for maintaining said bolster and side frame in squared relation.

13. In a car truck, the combination of a side frame and a bolster, a coil spring, a leaf spring having three points of connection, one point interconnecting said leaf spring to said bolster and a second point connecting said leaf spring to said side frame, the third point connecting said leaf spring to said bolster through said coil spring, and spaced guiding faces on said side frame cooperating with said leaf spring for maintaining said side frame and bolster in squared relation.

14. In a car truck, the combination of a side frame and a bolster, a spring carried by said side frame and supporting said bolster through a non-resilient inter-connected engagement at one point and through a resilient connection at another point, and spaced guiding faces on said side frame cooperating with said spring for maintaining said side frame and bolster in squared relation.

15. In a car truck, the combination of a side frame and a bolster, a spring carried by said side frame and supporting said bolster partly through a non-resilient inter-connection and partly through another spring, and spaced guiding faces on said side frame cooperating with said first named spring for maintaining said side frame and bolster in squared relation.

16. In a truck, the combination of a side frame including tension and compression members and spaced integrally connecting columns forming a window therewith, a load carrying member extending into said window and having sliding cooperation with said columns, seats provided on said load carrying member inwardly and outwardly of said columns, a spring seated on said side frame in said window and supportingly engaging said seats, means inter-connecting said spring and seats, and means on said columns engaging said spring for maintaining said load carrying member in squared relation to said side frame.

17. In a truck, the combination of a side frame including tension and compression members and spaced integrally connecting columns forming a window therewith, a load carrying member extending into said window and having sliding cooperation with said columns, seats provided on said load carrying member inwardly and outwardly of said columns, a spring seated on said side frame in said window and supportingly engaging said seats, means inter-connecting said spring and seats, and means on said side frame engaging said spring for maintaining said load carrying member in squared relation to said side frame.

18. In a truck, the combination of a side frame including tension and compression members and spaced integrally connecting columns forming a window therewith, a load carrying member extending into said window and having sliding cooperation with said columns, seats provided on said load carrying member inwardly and outwardly of said columns, a spring seated on said side frame in said window and supportingly engaging said seats, means inter-connecting said spring and seats, and means on said columns cooperating with said spring for maintaining said load carrying member in squared relation to said side frame.

19. In a truck, the combination of a side frame including tension and compression members and spaced integrally connecting columns forming a window therewith, a load carrying member extending into said window and having sliding cooperation with said columns, seats provided on said load carrying member inwardly and outwardly of said columns, a spring seated on said side frame in said window and supportingly engaging said seats, means inter-connecting said spring and seats, and means on said side frame cooperating with said spring for maintaining said load carrying member in squared relation to said side frame.

20. In a truck, the combination of a side frame, a load carrying member, seats provided on said load carrying member inwardly and outwardly of said side frame, a spring seated on said side frame and supportingly engaging said seats, means inter-connecting said spring and seats, and means on said side frame engaging said spring for maintaining said load carrying member in squared relation to said side frame.

21. In a truck, the combination of a side frame, a load carrying member, seats provided on said load carrying member inwardly and outwardly of said side frame, a spring seated on said side frame and supportingly engaging said seats, means inter-connecting said spring and seats, and means on said side frame cooperating with said spring for maintaining said load carrying member in squared relation to said side frame.

22. In a truck, the combination of a side frame including tension and compression members and spaced integrally connecting columns forming a window therewith, a load carrying member extending into said window and having sliding cooperation with said columns, a spring seat provided on said load carrying member, a transversely disposed spring seated on said side frame in said window and supportingly engaging said seat, means inter-connecting said spring and seat, and means on said columns engaging said spring for maintaining said load carrying member in squared relation to said side frame.

23. In a truck, the combination of a side frame including tension and compression members and spaced integrally connecting columns forming a window therewith, a load carrying member extending into said window and having sliding co-operation with said columns, a spring seat provided on said load carrying member, a transversely disposed spring seated on said side frame in said window and supportingly engaging said seat, means inter-connecting said spring and seat, and means on said side frame engaging said spring for maintaining said load carrying member in squared relation to said side frame.

24. In a truck, the combination of a side frame including tension and compression members and spaced integrally connecting columns forming a window therewith, a load carrying member extending into said window and having sliding co-operation with said columns, a spring seat provided on said load carrying member, a transversely disposed spring seated on said side frame in said window and supportingly engaging said seat, means inter-connecting said spring and seat, and means on said columns cooperating with said spring for maintaining said load carrying member in squared relation to said side frame.

25. In a truck, the combination of a side frame including tension and compression members and spaced integrally connecting columns forming a window therewith, a load carrying member extending into said window and having sliding co-operation with said columns, a spring seat provided on said load carrying member, a transversely disposed spring seated on said side frame in said window and supportingly engaging said seat, means inter-connecting said spring and seat, and means on said side frame cooperating with said spring for maintaining said load carrying member in squared relation to said side frame.

26. In a truck, the combination of a side frame, a load carrying member, a spring seat provided on said load carrying member, a transversely disposed spring seated on said side frame in said window and supportingly engaging said seat, means inter-connecting said spring and seat, and means on said columns engaging said spring for maintaining said load carrying member in squared relation to said side frame.

27. In a truck, the combination of a side frame, a load carrying member, a spring seat provided on said load carrying member, a transversely disposed spring seated on said side frame in said window and supportingly engaging said seat, means interconnecting said spring and seat, and means on said side frame engaging said spring for maintaining said load carrying member in squared relation to said side frame.

28. In a truck, the combination of a side frame including tension and compression members and spaced integrally connecting columns forming a window therewith, a load carrying member extending into said window and having sliding co-operation with said columns, seats provided on said load carrying member inwardly and outwardly of said columns and provided with depending dowels, a spring seated on said side frame in said window and supportingly engaging said seats, said spring having portions for receiving said dowels, and means on said columns engaging said spring for maintaining said load carrying member in squared relation to said side frame.

29. In a truck, the combination of a side frame including tension and compression members and spaced integrally connecting columns forming a window therewith, a load carrying member extending into said window and having sliding co-operation with said columns, seats provided on said load carrying member inwardly and outwardly of said columns and provided with depending dowels, a spring seated on said side frame in said window and supportingly engaging said seats, said spring having portions for receiving said dowels, and means on said side frame engaging said spring for maintaining said load carrying member in squared relation to said side frame.

30. In a truck, the combination of a side frame, a load carrying member, seats provided on said load carrying member inwardly and outwardly of said side frame, said seats having depending dowels, a spring seated on said side frame and supportingly engaging said seats, said spring having portions for receiving said dowels, and means on said side frame engaging said spring for maintaining said load carrying member in squared relation to said side frame.

31. In a truck, the combination of a side frame, a load carrying member, seats provided on said load carrying member inwardly and outwardly of said side frame, said seats having depending dowels, a spring seated on said side frame and supportingly engaging said seats, said spring having portions for receiving said dowels, and means on said side frame cooperating with said spring for maintaining said load carrying member in squared relation to said side frame.

32. In a truck, the combination of a side frame including tension and compression members and spaced integrally connecting columns forming a window therewith, a load carrying member extending into said window and having sliding co-operation with said columns, seats provided on said load carrying member inwardly and outwardly of said columns and provided with depending dowels, a spring seated on said side frame in said window and supportingly engaging said seats, said spring having portions for receiving said dowels, and means on said columns cooperating with said spring for maintaining said load carrying member in squared relation to said side frame.

33. In a truck, the combination of a side frame including tension and compression members and spaced integrally connecting columns forming a window therewith, a load carrying member extending into said window and having slidng co-operation with said columns, seats provided on said load carrying member inwardly and outwardly of said columns and provided with depending dowels, a spring seated on said side frame in said window and supportingly engaging said seats, said spring having portions for receiving said dowels, and means on said side frame cooperating with said spring for maintaining said load carrying member in squared relation to said side frame.

34. In a truck, the combination of a side frame, a load carrying member, a spring seat provided on said load carrying member and having a depending dowel, a transversely disposed spring seated on said side frame and supportingly engaging said spring seat, said spring having a portion adapted to receive said dowel, and means on said side frame cooperating with said spring for maintaining said load carrying member in squared relation to said side frame.

35. In a truck, the combination of a side frame, a load carrying member, a spring seat provided on said load carrying member and having a depending dowel, a transversely disposed spring seated on said side frame and supportingly engaging said spring seat, said spring having a portion adapted to receive said dowel, and means on said side frame cooperating with said spring for maintaining said load carrying member in squared relation to said side frame.

36. In a truck, the combination of a side frame including tension and compression members and spaced integrally connecting columns forming a window therewith, a load carrying member extending into said window and having sliding cooperation with said columns, a spring seat provided on said load carrying member and having a depending dowel, a transversely disposed spring seated on said side frame in said window and supportingly engaging said spring seat, said spring having a portion adapted to receive said dowel, and means on said columns cooperating with said spring for maintaining said load carrying member in squared relation to said side frame.

37. In a truck, the combination of a side frame including tension and compression members and spaced integrally connecting columns forming a window therewith, a load carrying member extending into said window and having sliding cooperation with said columns, a spring seat provided on said load carrying member and having a depending dowel, a transversely disposed spring seated on said side frame in said window and supportingly engaging said seat, said spring having a portion adapted to receive said dowel, and means on said side frame cooperating with said spring for maintaining said load carrying member in squared relation to said side frame.

38. In a truck, the combination of a side frame including tension and compression members and spaced integrally connecting columns forming a window therewith, a load carrying member extending into said window and having sliding cooperation with said columns, a spring seat provided on said load carrying member and having a depending dowel, a transversely disposed spring seated on said side frame in said window and supportingly engaging said seat, said spring having a portion adapted to receive said dowel, and means on said columns cooperating with said spring for maintaining said load carrying member in squared relation to said side frame.

39. In a truck, the combination of a side frame including tension and compression members and spaced integrally connecting columns forming a window therewith, a load carrying member extending into said window and having sliding cooperation with said columns, a spring seat provided on said load carrying member and having a depending dowel, a transversely disposed spring seated on said side frame in said window and supportingly engaging said seat, said spring having a portion adapted to receive said dowel, and means on said side frame cooperating with said spring for maintaining said load carrying member in squared relation to said side frame.

WILLIAM C. HEDGCOCK.